United States Patent [19]

Brown et al.

[11] 3,819,574

[45] June 25, 1974

[54] DIALKYLPHENOLTHIAZINES AND PHENOLIC ANTIOXIDANTS AS STABILIZING COMPOSITIONS

[75] Inventors: Wade Brown, Yonkers; Joseph Farber, Yorktown Heights, both of N.Y.

[73] Assignee: Ciba-Geigy Corporation, Ardsley, N.Y.

[22] Filed: Jan. 20, 1972

[21] Appl. No.: 219,506

Related U.S. Application Data

[63] Continuation-in-part of Ser. No. 28,024, April 13, 1970, abandoned.

[52] U.S. Cl...... 260/45.8 SN, 252/402, 260/28.5 R, 260/45.85, 260/45.95, 260/800
[51] Int. Cl. ............................................ C08f 45/58
[58] Field of Search........ 260/45.8 SN, 800, 28.5 R; 252/402

[56] References Cited

UNITED STATES PATENTS

| | | | |
|---|---|---|---|
| 2,605,249 | 7/1952 | Albert | 260/45.8 SN |
| 2,998,405 | 8/1961 | Weldy | 260/45.8 SN |
| 3,190,852 | 6/1965 | Doyle | 260/45.8 SS |
| 3,285,855 | 11/1966 | Dexter et al. | 252/57 |

*Primary Examiner*—M. J. Welsh

[57] ABSTRACT

Dialkylphenothiazines and phenolic antioxidants are synergistic stabilizing compositions. These compositions stabilize against oxidative and thermal degradation of organic materials normally subject to such degradations, especially synthetic polyolefins such as polypropylene. An example of such compositions is 3,7-di-t-octylphenothiazine and tetrakis-[methylene 3-(3',5'-di-t-butyl-4'-hydroxyphenyl)propionate]methane.

2 Claims, No Drawings

DIALKYLPHENOLTHIAZINES AND PHENOLIC ANTIOXIDANTS AS STABILIZING COMPOSITIONS

This application is a continuation-in-part of the copending application Ser. No. 28,024, filed Apr. 13, 1970, now abandoned.

DETAILED DESCRIPTION

This invention relates to the stabilization of organic materials normally subject to deterioration by exposure to heat and/or oxygen by incorporating therein a synergistic stabilizing composition which comprises a dialkylphenothiazine and a phenolic antioxidant.

The dialkylphenothiazines can be represented by the formula

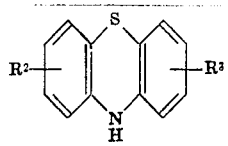

wherein
  $R^2$ and $R^3$ are independently selected from an alkyl group having from one to 18 carbon atoms or a cycloalkyl group having from four to eight carbon atoms.

Although alkyl substituents in any positions in the aromatic rings are useful the compounds having the alkyl substituents in the 3 and 7 positions are preferred. Furthermore higher alkyl groups having from six to 18 carbon atoms are also preferred. Illustrative examples of the alkyl groups that can be present on the phenothiazine are normal, iso- or tertiary-alkyl groups, for example methyl, ethyl, n-propyl, n-butyl, n-pentyl, n-hexyl, n-heptyl, n-octyl, n-nonyl, n-dodecyl, n-hexadecyl, n-octadecyl, iso-propyl, iso-butyl, iso-pentyl, tert-butyl, tert-pentyl, tert-hexyl, tert-octyl, tert-nonyl, tert-dodecyl, tert-tetradecyl, tert-octadecyl and similar groups. Preferably, however, $R^2$ and $R^3$ are each tertiary alkyl groups.

Illustrative examples of phenothiazines which can be used in combination with the phenolic antioxidants are: 3,7-dimethylphenothiazine, 2,8-diisopropylphenothiazine, 3,8-di-t-butylphenothiazine, 3,7-di-n-hexylphenothiazine, 3,7-di-t-octylphenothiazine, 2,8-di-t-octylphenothiazine, 4,9-di-n-dodecylphenothiazine, 3,7-di-t-hexadecylphenothiazine, 3,7-di-n-octyladecylphenothiazine, 3,7-bis-(1,1,3,3-tetramethylbutyl)phenothiazine, 3,7-bis-(1,1,3,3-tetramethylhexyl)phenothiazine, 3-methyl-7-tert-butylphenothiazine, 3-tert-butyl-7-(1,1,3,3-tetramethylbutyl)phenothiazine, 2-n-hexyl-8-tert-octadecylphenothiazine and the like.

Any phenolic antioxidant can be employed to prepare the stabilizing compositions of this invention. Illustrative examples of such phenolic compounds are given below:

1. Phenolic compounds having the general formula $$Q—(CH_2)_w—A$$

wherein
Q is

A is — $CR(COOR'')_2$

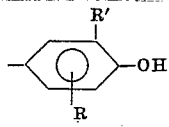

R is hydrogen or lower alkyl
R' is lower alkyl
R'' is alkyl group having from 6 – 24 carbon atoms w is an integer from 0 to 4.

Illustrative examples of the compounds shown above are

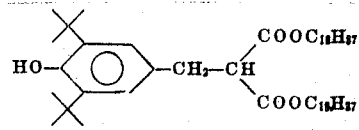

di-n-octadecyl(3-t-butyl-4-hydroxy-5-methylbenzyl)malonate
di-n-octadecyl $\alpha$(3-t-butyl-4-hydroxy-5-methyl-benzyl)malonate which is disclosed in the Netherlands Pat. No. 6,711,199, Feb. 19, 1968
di-n-octadecyl-$\alpha,\alpha'$-bis-(3-t-butyl-4-hydroxy-5-methylbenzyl)malonate which is disclosed in the Netherland Pat. No. 6,803,498, Sept. 18, 1968.

2. Phenolic compounds having the general formula $$Q—R$$

Illustrative examples of the compounds shown above are
2,6-di-t-butylphenol
2,4,6-tri-t-butylphenol
2,6-dimethylphenol
2-methyl-4,6-di-t-butylphenol and the like.

3. Phenolic compounds having the formula $$Q—C_wH_{2w}—Q$$

2,2'-methylene-bis(6-t-butyl-4-methylphenol)
2,2'-methylene-bis(6-t-butyl-4-ethylphenol)
4,4'-butylidene-bis(2,6-di-t-butylphenol)
4,4'-(2-butylidene)-bis(2-t-butyl-5-methylphenol)
2,2'-methylene-bis[6-(1-methylcyclohexyl)-4-methylphenol]or and the like.

4. Phenolic compounds having the formula $$R—O—Q$$

Illustrative examples of such compounds are
2,5-di-t-butylhydroquinone
2,6-di-t-butylhydroquinone
2,6-di-t-butyl-4-hydroxyanisole 5. Phenolic compounds having the formula $$Q—S—Q$$

Illustrative examples of such compounds are
4,4'-thiobis-(2-t-butyl-5-methylphenol)
4,4'-thiobis-(2-t-butyl-6-methylphenol)

2,2'-thiobis-(6-t-butyl-4-methylphenol)
6. Phenolic compounds having the formula

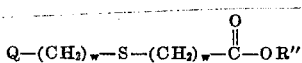

Illustrative examples of such compounds are
octadecyl-(3,5-dimethyl-4-hydroxybenzylthio)-
 acetate
dodecyl-(3,5-di-t-butyl-4-hydroxybenzylthio)-
 propionate
7. Phenolic compounds having the formula

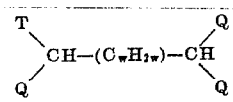

wherein
 T is hydrogen
 R or Q as defined above.
Illustrative examples of such compounds are
1,1,3-tris(3,5-dimethyl-4-hydroxyphenyl)-propane
1,1,3-tris(5-t-butyl-4-hydroxy-2-methylphenyl)-
 butane
1,1,5,5-tetrakis-(3'-t-butyl-4'-hydroxy-6'-methyl-
 phenyl)-n-pentane
8. Phenolic compounds having the formula

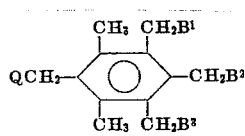

wherein $B^1$, $B^2$ and $B^3$ are hydrogen, methyl or Q, provided that when $B^1$ and $B^3$ are Q then $B^2$ is hydrogen or methyl and when $B^3$ is Q then $B^1$ and $B^2$ are hydrogen or methyl.
Illustrative examples of such compounds are
1,4-di(3,5-di-t-butyl-4-hydroxybenzyl)-2,3,5,6-tetramethylbenzene
1,3,5-tri(3,5-di-t-butyl-4-hydroxybenzyl)-2,4,6-trimethylbenzene
9. Phenolic compounds having the formula

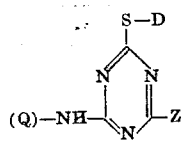

wherein
 Z is NHQ, —S—D or —O—Q
 D is alkyl group having from 6 - 12 carbon atoms or
 —($C_wH_{2w}$)—S—R''
Illustrative examples of such compounds are
2,4-bis-(n-octylthio)-6-(3,5-di-t-butyl-4-hydroxyaniline)-1,3,5-triazine
6-(4-hydroxy-3-methyl-5-t-butylanilino-2,4-bis-(n-octylthio)-1,3,5-triazine
6-(hydroxy-3,5-dimethylanilino)-2,4-bis-(n-octylthio)-1,3,5-triazine
6-(4-hydroxy-3,5-di-t-butylanilino)-2,4-bis-(n-octylthioethylthio)-1,3,5-triazine
6-(4-hydroxy-3,5-di-t-butylanilino)-4-(4-hydroxy-3,5-di-t-butylphenoxy)-2-(n-octylthio)-1,3,5-triazine
2,4-bis(4-hydroxy-3,5-di-t-butylanilino)-6-(n-octylthio)-1,3,5-triazine.
The above phenolic triazine stabilizers are more fully described in U.S. Pat. No. 3,255,191.
10. Phenolic compounds having the formula

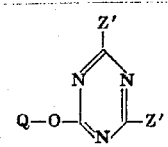

wherein
 Z' is —O—Q, —S—D or —S—($C_wH_{2w}$)—SD
Illustrative examples of such compounds are
2,3-bis-(3,5-di-t-butyl-4-hydroxyphenoxy)-6-(n-octylthio)-1,3,5-triazine
2,4,6-tris-(4-hydroxy-3,5-di-t-butylphenoxy)-1,3,5-triazine.
6-(4-hydroxy-3,5-di-t-butylphenoxy)-2,4-bis-(n-octylthioethylthio)-1,3,5-triazine
6-(4-hydroxy-3-methylphenoxy)-2,4-bis-(n-octylthio)-1,3,5-triazine
6-(4-hydroxy-3-t-butylphenoxy)-2,4-bis-(n-octylthioethylthio)-1,3,5-triazine
6-(4-hydroxy-3-methyl-5-t-butylphenoxy)-2,4-bis-(n-octylthio)-1,3,5-triazine
2,4-bis-(4-hydroxy-3-methyl-5-t-butylphenoxy)-6-(n-octylthio)-1,3,5-triazine
2,4,6-tris-(4-hydroxy-3-methyl-5-t-butylphenoxy)-1,3,5-triazine
6-(4-hydroxy-3,5-di-t-butylphenoxy)-2,4-bis-(n-octylthiopropylthio)-1,3,5-triazine
6-(4-hydroxy-3,5-di-t-butylphenoxy)-2,4-bis-(n-dodecylthioethylthio)-1,3,5-triazine
2,4-bis-(4-hydroxy-3,5-di-t-butylphenoxy)-6-butylthio-1,3,5-triazine
2,4-bis-(4-hydroxy-3,5-di-t-butylphenoxy)-6-(n-octadecylthio)-1,3,5-triazine
2,4-bis-(4-hydroxy-3,5-di-t-butylphenoxy)-6-(n-dodecylthio)-1,3,5-triazine
2,4-bis-(4-hydroxy-3,5-di-t-butylphenoxy)-6-(n-octylthiopropylthio)-1,3,5-triazine
2,4-bis-(4-hydroxy-3,5-di-t-butylphenoxy)-6-(n-octylthioethylthio)-1,3,5-triazine
2,4-bis-(4-hydroxy-3,5-di-t-butylphenoxy)-6-(n-dodecylthioethylthio)-1,3,5-triazine.
The above phenolic triazine stabilizers are more fully described in U.S. Pat. No. 3,255,191.
11. Phenolic compounds having the formula
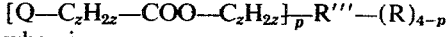
wherein
 p is an integer from 2 to 4 and
 R''' is a tetravalent radical selected from aliphatic hydrocarbons having from 1 to 30 carbon atoms aliphatic mono and dithioethers having from 1 to 30 carbon atoms aliphatic mono and diethers having from 1 to 30 carbon atoms.

Illustrative examples of such compounds are

Sub-class I n-Octadecyl 3-(3,5-di-t-butyl-4-hydroxyphenyl)-propionate
n-Octadecyl 3,5-di-t-butyl-4-hydroxyphenylacetate
n-Octadecyl 3,5-di-t-butyl-4-hydroxybenzoate
n-Hexyl 3,5-di-t-butyl-4-hydroxyphenylbenzoate
n-Dodecyl 3,5-di-t-butyl-4-hydroxyphenylbenzoate
Neo-dodecyl 3-(3,5-di-t-butyl-4-hydroxyphenyl)-propionate
Dodecyl β-(3,5-di-t-butyl-4-hydroxyphenyl)-propionate
Ethyl α-(4-hydroxy-3,5-di-t-butylphenyl)-isobutyrate
Octadecyl α-(4-hydroxy-3,5-di-t-butylphenyl)-isobutyrate
Octadecyl α-(4-hydroxy-3,5-di-t-butylphenyl)-propionate Sub-class II 2-(n-octylthio)ethyl 3,5-di-t-butyl-4-hydroxybenzoate
2-(n-octylthio)ethyl 3,5-di-t-butyl-4-hydroxyphenylacetate
2-(n-octadecylthio)ethyl 3,5-di-t-butyl-4-hydroxyphenylacetate
2-(n-octadecylthio)ethyl 3,5-di-t-butyl-4-hydroxy benzoate
2-(2-hydroxyethylthio)ethyl 3,5-di-t-butyl-4-hydroxybenzoate
2,2'-Thiodiethanol bis(3,5-di-t-butyl-4-hydroxyphenyl)acetate
Diethyl glycol bis-[3,5-di-t-butyl-4-hydroxyphenyl)-propionate]
2-(n-octadecylthio)ethyl 3-(3,5-di-t-butyl-4-hydroxyphenyl)propionate
2,2'-Thiodiethanol-bis-3-(3,5-di-t-butyl-4-hydroxyphenyl)propionate
Stearamido N,N-bis-[ethylene 3-(3,5-di-t-butyl-4-hydroxyphenyl)propionate]
n-Butylimino N,N-bis-[ethylene 3-(3,5-di-t-butyl-4-hydroxyphenyl)propionate]
2-(2-stearoyloxyethylthio)ethyl 3,5-di-t-butyl-4-hydroxybenzoate
2-(2-hydroxyethylthio)ethyl 7-(3-methyl-5-t-butyl-4-hydroxyphenyl)heptanoate
2-(2-stearoyloxyethylthio)ethyl 7-(3-methyl-5-t-butyl-4-hydroxyphenyl)heptanoate Sub-class III 1,2-propylene glycol bis-[3-(3,5-di-t-butyl-4-hydroxyphenyl)propionate]
Ethylene glycol bis-[3-(3,5-di-t-butyl-4-hydroxyphenyl)propionate]
Neopentylglycol bis-[3-(3,5-di-t-butyl-4-hydroxyphenyl)propionate]
Ethylene glycol bis-(3,5-di-t-butyl-4-hydroxyphenylacetate)
Glycerine-1-n-octadecanoate-2,3-bis-(3,5-di-t-butyl-4-hydroxyphenylacetate)
Pentaethylthritol-tetrakis-[3-3-(3,5-di-t-butyl-4-hydroxyphenyl)propionate]
1,1,1-trimethylol-tris[-3-(3,5-di-t-butyl-4-hydroxyphenyl)propionate]
Sorbitol hexa-[3-(3,5-di-t-butyl-4-hydroxyphenyl)propionate]
1,2,3-butanetriol tris-[3-(3,5-di-t-butyl-4-hydroxyphenyl)propionate]
2-hydroxyethyl 7-(3-methyl-5-t-butyl-4-hydroxyphenyl)heptanoate
2-stearoyloxyethyl 7-(3-methyl-5-t-butyl-4-hydroxyphenyl)heptanoate
1,6-n-hexanediol-bis[(3',5'-di-t-butyl-4-hydroxyphenyl)propionate]

The above phenolic ester stabilizers of sub-classes I, II and III are more fully described in U.S. Pat. No. 3,330,859, Ser. No. 354,464, filed Mar. 24, 1964 and Ser. No. 359,460, filed Apr. 13, 1964, respectively.

12. Phenolic compounds having the formula

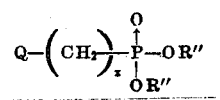

Illustrative examples of such compounds are

Dioctadecyl 3,5-di-t-butyl-4-hydroxybenzylphosphonate Di-n-octadecyl 3-t-butyl-4-hydroxy-5-methyl-benzylphosphonate
Di-n-octadecyl 1-(3,5-di-t-butyl-4-hydroxyphenyl)-ethanephosphonate
Di-n-tetradecyl 3,5-di-t-butyl-4-hydroxybenzylphosphonate
Di-n-hexadecyl 3,5-di-t-butyl-4-hydroxybenzylphosphonate
Didocosyl-3,5-di-t-butyl-4-hydroxybenzylphosphonate
Di-n-octadecyl 3,5-di-t-butyl-4-hydroxybenzylphosphonate The above di-(higher)alkyl phenolic phosphonates are more fully described in U.S. Pat. No. 3,281,505.

In general at least one dialkylphenothiazine compound and at least one phenolic antioxidant are employed in the amounts of from 0.005 to about 5 percent by weight of the organic material to be stabilized. A more preferred range is from about 0.01 to about 1 percent of each of said compounds. Thus the stabilizing composition itself consists of from 0.1 to 99.9 percent of each component and preferably the dialkylphenothiazine and a phenolic antioxidant are in a range from 1 to 99 percent of each.

The novel stabilizing composition of this invention can be employed alone or in combination with other stabilizers, pigments, UV-absorbers, dyes, or other additives which are advantageously used in a particular composition.

The stabilizing composition of the present invention is useful in stabilizing organic materials normally subject to oxidative or thermal deterioration. Materials which are thus stabilized include synthetic organic polymeric substances such as vinyl resins formed from the polymerization of vinyl halides or from the copolymerization of vinyl halides with unsaturated polymerizable compounds, e.g., vinyl esters, α,β-unsaturated aldehydes and unsaturated hydrocarbons such as butadienes and styrene, poly-α-olefins such as polyethylene, polypropylene, polybutylene, polyisoprene and the like, including copolymers of poly-α-olefins, polyurethanes such as are prepared from polyols and organic polyisocyanates; polyamides such as polyhexamethylene adipamide and polycaprolactam, polyesters such as polymethylene or polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials stabilized according to the present invention include lubrication oil of the aliphatic ester type, e.g., (di)2-ethylhexyl)-azelate, pentaerythritol tetracaproate and the like; animal and vegetable derived oils, e.g., linseed oil, fat, tallow, lard, peanut oil, cod liver oil, castor oil, palm oil, corn oil, cotton seed oil, and the like; hydrocarbon material such as gasoline, mineral oil, fuel oil, drying oil, cutting fluids, waxes, resins, and the like, fatty acids, soaps and the like.

Although the stabilizing composition of this invention is effective in stabilizing the above listed organic materials it is particularly effective in stabilizing polyolefins such as polypropylene and polyethylene. The unusual effectiveness of the synergistic stabilizing composition is noted when polyolefin is used in the presence of materials which have the ability to extract stabilizers from the polymers. This stabilizing composition is also especially effective when the polyolefin is in contact with a metal such as, for example, copper, iron, nickel, cobalt, manganese, titanium, vanadium, chromium and cadmium.

The stabilizing composition has particular ability in polypropylene wire insulation where the insulated wires are used in waterproof cables. Waterproofing of these cables is accomplished by inclusion of a petrolatum filling material. Thus, degradation of the polypropylene insulation is favored by several factors. Copper is known to catalyze polypropylene degradation. Petrolatum can extract stabilizing additives from the insulation. Thus, the stabilizing composition extends the stability of polypropylene when in the presence of both copper and petrolatum.

To further illustrate the instant invention there are presented below specific examples of various stabilizing compositions and the stabilization of different substrates with said compositions. The degradation of organic materials is slow at ambient temperatures under normal conditions, even in the absence of stabilizers. Thus, in order to obtain results within a convenient time indicating the effects of stabilizers, the testing must be conducted at elevated temperatures and under more severe conditions than normally encountered.

The Test Procedure

Unstabilized polypropylene powder (Hercules Profax 6501) is thoroughly blended with a stabilizing composition. Pellets are prepared from the blended powder by extruding at 500°F (1 in. screw diameter, L/D=20/1). Sheets of 10 mil thickness are compression molded at 420°F from the extruded pellets. The sheets are then cut into 1 in. × 1 ½ in. plaques which are aged in USP petroleum for 18 hours at 85°C. After ageing the samples are removed and the excess petrolatum wiped off. Oxidative induction time is determined on the aged samples with a duPont Model 900 Differential Thermal Analyzer equipped with a Differential Scanning colorimeter cell (DSC). A copper pan is used as the sample container. The sample is heated to 200°C under nitrogen and the heating is continued isothermally. Oxygen is then admitted (1.0 standard cubic foot per hour) and the time to exotherm recorded.

In Table I below are given test results for samples prepared as described above wherein the stabilization composition consisted of the indicated amounts of the specific dialkylphenothiazine and phenolic antioxidant.

TABLE I

| Example | Stabilizers | | Wt.% | Minutes to Exotherm |
|---|---|---|---|---|
| 1 | Antioxidant | A | 0.4 | 12 |
| 2 | do. | A | 0.6 | 15 |
| 3 | Phenothiazine | X | 0.4 | 7 |
| 4 | do. | X | 0.6 | 10 |
| 5 | Antioxidant | A | 0.38 | 47 |
|   | Phenothiazine | X | 0.02 |   |
| 6 | Antioxidant | A | 0.34 | 82 |
|   | Phenothiazine | X | 0.06 |   |
| 7 | Antioxidant | A | 0.50 | 103 |
|   | Phenothiazine | X | 0.10 |   |
| 8 | Antioxidant | A | 0.40 | 84 |
|   | Phenothiazine | X | 0.20 |   |
| 9 | Antioxidant | A | 0.10 | 33 |
|   | Phenothiazine | X | 0.50 |   |

Antioxidant A is tetrakis-[methylene 3-(3',5'-di-t-butyl-4'-hydroxyphenyl)-propionate]-methane.

Phenothiazine X is 3,7-bis-(1,1,3,3-tetramethylhexyl)-phenothiazine.

When the stabilizing compositions used in Table 1 are added to high impact polystyrene, polyethylene, nylon 6,6 salt (hexamethylene diamine adipate), polyacetal and polyester synthetic lubricants, the substrates are stabilized substantially against thermal and/or oxidative deterioration.

In addition to the stabilizing composition employed in Table 1, the following compositions are also effective in stabilizing polypropylene and other substrates:

1. 0.01% 3,7-dimethylphenothiazine
0.02% di-n-octadecyl-α-(3-t-butyl-4-hydroxy-5-methylbenzyl)malonate
2. 0.005% 3,7-di-t-octadecylphenothiazine
0.005% tetrakis-[methylene 3-(3',5'-di-t-butyl-4'-hydroxyphenyl)propionate]-methane
3. 0.01% 2,8-di-t-octylphenothiazine
1.0% 2,6-di-t-butyl-4-methylphenol
4. 1.0% 4,9-di-n-dodecylphenothiazine
0.01% 2,4,6-tris-(3',5'-di-t-butyl-4'-hydroxyphenyl)-1,3,5-s-triazine
5. 0.02% 3-methyl-7-t-butylphenothiazine
0.02% 4,4'-thio-bis-(6-t-butyl-m-cresol)
6. 0.05% 2-n-hexyl-8-t-octadecylphenothiazine
0.03% 1,1,3-tris-(5-t-butyl-4-hydroxy-2-methylphenyl)-butane
7. 0.2% 3,7-bis-(1,1,3,3-tetramethylbutyl)phenothiazine
0.2% 2,4,6-tris-(3,5-di-t-butyl-4-hydroxybenzyl)-1,3,5-trimethylbenzene
8. 0.5% 3-isopropyl-7-(1,1,3,3-tetramethylbutyl)-phenothiazine
0.3% 4,4'-(2-butylidene)-bis-(2-t-butyl-5-methylphenol
9. 0.1% 2,8-di-t-hexylphenothiazine
0.05% 2,4-bis-(n-octylthio)-6-(3,5-di-t-butyl-4-hydroxyaniline)-1,3,5-triazine
10. 0.05% 3,7-di-t-dodecylphenothiazine 0.02% dioctadecyl 3,5-di-t-butyl-4-hydroxybenzyl-phosphonate 11. 0.01% 3,7-bis-(1,1,3,3-tetramethylbutyl)-pehnotriazine
0.02% 2,4,6-tris-(3,5-di-t-butyl-4-hydroxybenzyloxy)-1,3,5-triazine 12. 0.07% 3,7-di-t-octadecylphenothiazine
0.05% Reaction product of styrene, cyclopentadiene and hydroquinone (in equimolar proportions)

What is claimed is:

1. A composition of matter comprising polypropylene and from 0.005 to 5 percent by weight of the total composition of each of 3,7-bis-(1,1,3,3-tetramethylbutyl)phenothiazine and tetrakis-[methylene 3-(3',5'-di-t-butyl-4'-hydroxyphenyl)-propionate]-methane.

2. The composition according to claim 1 wherein said polypropylene is in the presence of petrolatum and copper.